United States Patent
Shimonou

[11] Patent Number: 4,648,085
[45] Date of Patent: Mar. 3, 1987

[54] OPTICAL INFORMATION RECORDING AND READING APPARATUS WITH ERROR CORRECTION

[75] Inventor: Shigeru Shimonou, Tokyo, Japan

[73] Assignee: NEC Corporation, Tokyo, Japan

[21] Appl. No.: 610,168

[22] Filed: May 14, 1984

[30] Foreign Application Priority Data

May 12, 1983 [JP] Japan ............................. 58-83083
May 12, 1983 [JP] Japan ............................. 58-83084

[51] Int. Cl.[4] .............................................. G11B 7/00
[52] U.S. Cl. ........................................ 369/54; 369/58; 369/107
[58] Field of Search ..................... 369/53, 54, 58, 48, 369/49, 106, 111, 116, 107; 346/76 L

[56] References Cited

U.S. PATENT DOCUMENTS

| | | | |
|---|---|---|---|
| 4,093,961 | 6/1978 | Kanamaru | 369/116 X |
| 4,145,758 | 3/1979 | Drexler et al. | 369/54 X |
| 4,308,612 | 12/1981 | Miyauchi et al. | 369/54 X |
| 4,488,277 | 12/1984 | McFarlane et al. | 369/54 X |
| 4,538,257 | 8/1985 | Klinger | 369/54 X |
| 4,554,654 | 11/1985 | Kato | 369/54 |

FOREIGN PATENT DOCUMENTS

57-88532 6/1982 Japan ................................. 369/54

Primary Examiner—Robert L. Richardson
Attorney, Agent, or Firm—Sughrue, Mion, Zinn, Macpeak & Seas

[57] ABSTRACT

An optical information recording and reading apparatus checks the recording of information simultaneously with recording of said information by means of a recording laser beam by detecting a deflected portion of the reflected beam of the recording laser beam from an optical recording medium. An intensity differential signal is generated by monitoring different portions of the deflected portion of the reflected beam. The intensity differential signal is insensitive to intensity changes in the recording laser beam. The accuracy of the recorded information is determined by sensing the change of polarity of the intensity signal. An error signal is generated as a function of the polarity of the intensity differential signal to re-record information not recorded properly.

10 Claims, 18 Drawing Figures

OPTICAL INFORMATION RECORDING AND READING APPARATUS WITH ERROR CORRECTION

BACKGROUND OF THE INVENTION

The present invention relates to an optical information recording and reading apparatus for recording and reading information into and out of an optical disk by means of a laser beam. More particularly, the present invention is concerned with an optical information recording and reading apparatus in which recorded information on the optical disk can be checked simultaneously with the recording in order to confirm whether the recording has been made correctly.

Generally, an optical information recording and reading apparatus employs an optical disk whose surface is coated by a photo-sensitive recording medium. The apparatus irradiates the optical disk with a tiny spot of laser beam for recording and reading information into and out of the medium. This type of apparatus can record information at a much higher density than the conventional apparatus such as magnetic disk apparatus. Accordingly, it can suitably be used as a recording apparatus having a large recording capacity. On the contrary, in this type of apparatus, mis-recording and mis-reading are often occurred due to the overly high density of recording of information.

More specifically, mis-recording is often caused by an insufficient irradiation of the laser beam and/or by a defect which may exist in the recording medium on the disk. In most optical disks presently utilized, recorded information cannot be erased and new information cannot be re-recorded thereon once the information is recorded on an vacant area of the medium. Therefore, it is quite important to confirm whether the recording has been made correctly because the area of the mis-recording should be invalidated and the mis-recorded information should be re-recorded in another area of the medium.

One of the conventional methods for confirming correct recording is to reproduce the information out of the optical disk after the recording process is completed in order to compare it with the original information. However, this method requires an additional step after recording for checking the recorded information.

Another method and a device for confirming correct recording are disclosed in the U.S. Pat. No. 4,145,758. This optical recording and reading apparatus has two optical systems for a recording laser beam and a reading laser beam, respectively. In this apparatus, a reading laser beam spot is positioned on the disk closely to the recording laser beam spot during recording the information so that the recorded information on the disk can be read immediately after the recording. Therefore, the recorded information on the disk can be checked substantially simultaneously with the recording. However, the reading laser beam spot is necessary to be precisely positioned on the same track to the recording laser beam spot. Accordingly, a control of two separate optical systems is extremely complicated.

The U.S. Pat. No. 4,308,612 discloses an optical recording apparatus which can perform the recording and an instantaneous check of the recorded information by means of a single laser beam applied to an optical disk. In this apparatus, the recorded information on the optical disk is checked by detecting a reflected beam of the recording laser beam reflected from the optical disk. When a pit is formed by the recording laser beam on the optical disk, the intensity level of the reflected beam is changed correspondingly. This apparatus compares the intensity level of the reflected beam with a predetermined reference level in order to confirm whether a pit corresponding to the information has been formed correctly. However, as a matter of fact, the intensity of the recording laser beam applied to the optical disk is changed over a large amplitude range depending upon the information to be recorded (the intensity of the laser beam is high when a pit is to be formed and is low when a pit is not to be formed). Namely, the intensity of the reflected beam is also changed by a large amplitude in the same phase to the recording beam. Therefore, it is quite difficult to discriminate between the minor intensity change of the reflected beam corresponding to the pit formation and the major intensity change corresponding to the intensity change of the recording laser beam. In addition, since the period of intensity change of the recording laser beam is extremely short, extremely high operation speeds are required for a comparator circuit and a logical processing circuit to detect the intensity change of the reflected beam by comparing the reflected beam with the reference level. Further, since the intensity of the reflected beam tends to fluctuate in accordance with other factors, the reference level set in the comparator circuit has to be selected with a sufficient margin and accuracy in order to correctly detect the intensity change of the reflected beam due to the formation of the pit. Thus, in practice, this apparatus cannot accurately check the recorded information on the disk though it requires complicated device of high performance.

SUMMARY OF THE INVENTION

Accordingly, an object of the present invention is to provide an optical information recording and reading apparatus which can accurately check a recorded information on an optical recording medium simultaneously with the recording by detecting a reflected beam of the recording laser beam from the optical recording medium.

Another object of the invention is to provide an optical information recording and reading apparatus which can reproduce the recorded information from an optical recording medium with a high fidelity.

BRIEF DESCRIPTION OF THE DRAWINGS

The above-mentioned and other objects, features and advantages of the present invention will be better understood from the following detailed description of a preferred embodiment of the present invention taken in conjunction with the accompanying drawings, wherein:

FIGS. 5(a) to 5(f) are waveform charts for explaining the recording operation of the embodiment shown in FIG. 1; and FIGS. 6(a) to 6(d) are waveform charts for explaining the reading operation of the embodiment shown in FIG. 1.

DESCRIPTION OF THE PREFERRED EMBODIMENT

Figure 1:
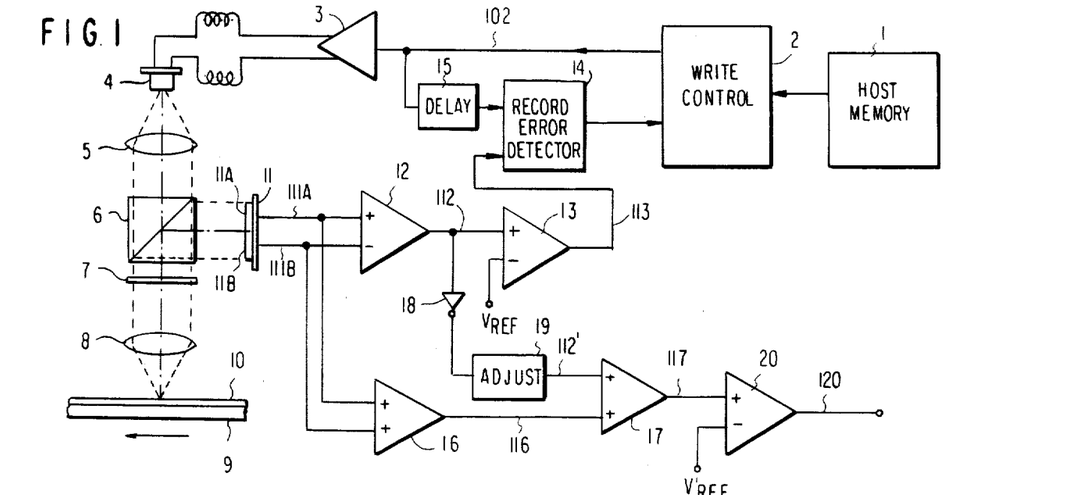
FIG. 1 is a schematic block diagram of an embodiment of an optical information recording and reading apparatus according to the present invention.

Referring to FIG. 1, data from a memory 1 is transformed into recording data signal 102 by timing-controlling in a recording control circuit 2. The recording data signal 102 inputs to a laser driving circuit 3. The laser driving circuit 3 supplies a semiconductor laser device 4 with an electric current for generating a recording laser beam in accordance with the recording data signal 102. During reading of the information, the laser driving circuit 3 supplies the semiconductor laser device 4 with an electric current of the low level which is suitable for producing a reading laser beam. A collimator lens 5 transforms the divergent laser beam emitted from the semiconductor laser device 4 into a parallel laser beam. The parallel laser beam passes through a polarizing beam splitter 6 and then through a quarter-wave plate 7. The laser beam coming into the polarizing beam splitter 6 is polarized linearly in its transmitting direction. The quarter-wave plate 7 changes the linearly polarized laser beam into a circularly polarized beam. A convergent lens 8 converges the circularly polarized beam to form a tiny spot onto a recording medium 10. The position of the convergent lens 8 is controlled such that the tiny spot is focussed on the designated track on the surface of the medium 10.

When information is to be recorded on the medium 10, a recording laser beam is applied to the medium 10 and forms a pit on the surface of the medium 10. The recording laser beam is then reflected by the surface of the medium 10. The intensity, phase and other factors of the reflected beam are changed depending on the formation of the pit on the surface of the medium 10.

When the information is read from the medium 10, a reading laser beam is applied to the surface of the medium 10. An intensity of the reading laser beam is too small to change the properties of the medium 10. When the reading laser beam is reflected by the surface of the medium 10, the intensity, phase and other factors of the reflected beam are changed depending on presence or absence of a pit on the medium 10.

The reflected beam from the surface of the medium 10 is changed again into a parallel beam by the convergent lens 8. The beam is then changed into a linearly polarized beam as it passes through the quarter-wave plate 7. The phase of this polarized beam is deviated by 90° with respect to the phase of the laser beam applied from the laser device 4 to the beam splitter 6. The polarized beam splitter 6 deflects the path of reflected beam to directed toward a photo-detector 11. The photo-detector 11 is divided into an upper section and lower section having light-receiving devices 11A and 11B, respectively. Accordingly, the sections of the photo-detector 11 receive respective halves of the reflected laser beam, and the vertical direction of the reflected laser beam on the photo-detector 11 corresponds to the horizontal direction of a recording medium carrier 9. Consequently, the photo-detector 11 receives the reflected laser beam dividing in the forward and backward direction of movement of the carrier 9.

The light-receiving devices 11A and 11B respectively put out signals 111A and 111B. A differential amplifier 12 produces differential output between these signals 111A and 111B. Namely, the differential amplifier 12 detects the deflection of the reflected beam coming from the beam splitter 6 by comparing the output of the upper light-receiving device 11A and the lower light-receiving device 11B. The output of the differential amplifier 12 is delivered as an intensity differential signal 112 to a comparator 13. The comparator 13 compares the intensity differential signal 112 with a reference level $V_{REF}$. When the intensity differential signal 112 has exceeded a predetermined level, the comparator 13 produces a pit formation signal 113 and delivers it to a record error detector 14. The error detector 14 compares the pit formation signal 113 with the record data signal 102 which has been delayed by a delay element 15. When the pit formation signal 113 and the delayed recording data signal 102 failed, to match, the error detector 14 supplies the record error signal 114 for a recording control circuit 2. Since the phase difference between the recording data signal 102 and the pit formation signal 113 is extremely small, the delay element 15 may be omitted if the requirement for the coincidence of timings between two signals is not so strict.

For the detection of change in the intensity of the reflected light, the signals 111A and 111B from the photo-detector 11 are added by an adding amplifier 16 and the synthetic output from the adding amplifier 16 (an intensity variance signal 116) is delivered to an adding amplifier 17. The other input of the adding amplifier 17 receives an intensity differential signal 112' which has been inverted by an inverter 18 and adjusted by a level adjusting circuit 19. The intensity differential signal 112' is synthesized with the intensity variance signal 116 to form a read signal 117. The read signal 117 is delivered to a comparator 20. The comparator 20 compares the read signal 17 with a reference level $V'_{REF}$ to make a binary coding of the read signal 117 and put out a digital reproduction signal 120.

Figure 2A:
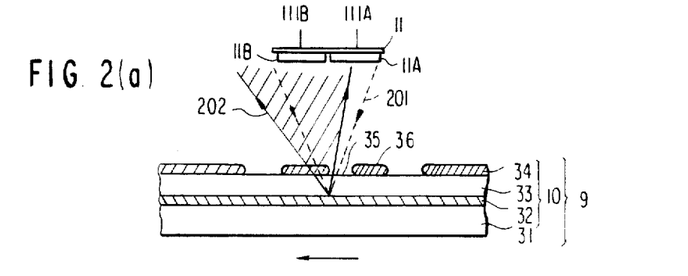
FIGS. 2(a) to 2(c) are sectional views of the optical disk and show the relationships between the information on an optical disk and a laser beam in the embodiment shown in FIG. 1.
Figure 2B:
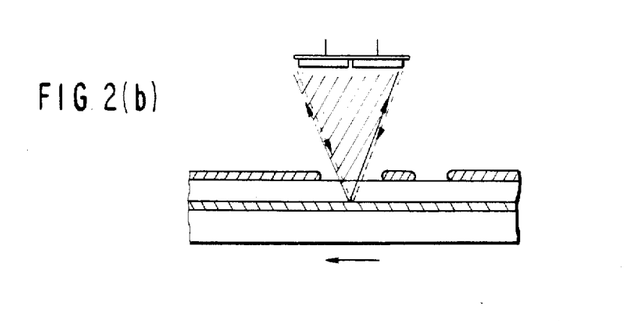
Figure 2C:
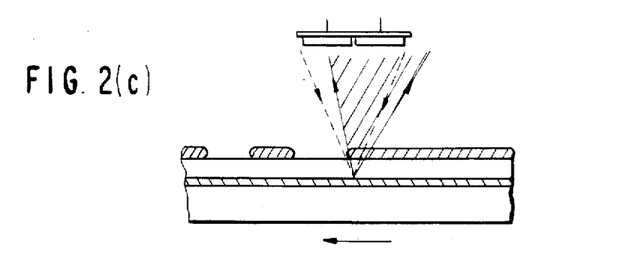

FIGS. 2(a) to 2(c) are sectional views of an optical disk 9 as used in the apparatus shown in FIG. 1. The optical disk 9 has a substrate 31 on which a photo-recording medium 10 is formed. The photo-recording medium 10 has a photoreflecting layer 32, intermediate layer 33 and a surface layer 34. When the recording beam spot is applied, the surface layer 34 is molten or evaporated to form a pit 35.

The substrate 31 can be formed of any material which is able to maintain the shape of the disk 9. Typical examples of the material of the substrate 31 are aluminum, acrylic resin and so forth. A material of the photoreflecting layer 32 has a high reflectivity to laser beam, such as aluminum, copper and the like. The intermediate layer 33 is provided for keeping a constant distance between the surface layer 34 and the reflecting layer 32. The intermediate layer 33 is made of a light-transmitting material such as acrylic resin, glass, $SiO_2$ and so forth. The thickness of the intermediate layer 33 is so selected that a substantially 180° phase difference is formed between the reflected beam from the surface layer 34 and the reflected beam from the reflecting layer 32 passing through the intermediate layer 33 and the surface layer 34. The surface layer 34 is a thin film which can be molten or evaporated by irradiation with a laser beam of high intensity. The surface layer 34 is formed of a metal or half metal membrane of Te, Bi or the like, having a thickness of about 100 Å.

In the region 36, which is devoid of the pit, the reflected beam from the surface layer 34 and the reflected beam from the reflecting layer 32 interfere to negate each other. Therefore, the intensity of the reflected beam from the region 36 is relatively low. On the other hand, in the region where the pit 35 is formed, the thickness of the surface layer 34 is zero or extremely small. Therefore, the laser beam directly impinges upon the intermediate layer 33 and is reflected by the reflecting layer 32 without being affected by the surface layer 34. Since no reflection caused by the surface layer 34 occurs in this region 35, the interference does not occur. Accordingly, the reflected laser beam has a relatively high intensity.

Considering the phase of the reflected beam, the phase of the laser beam 201 impinging upon the pit 35 is not delayed by the surface layer 34 either at its incidence or reflection. In contrast, the laser beam 201 impinging upon the region 36 passes through the surface layer 34 and the intermediate layer 33, and is reflected by the reflecting layer 32. The reflected beam 202 passes through the intermediate layer 33 and the surface layer 34 again. When the laser beam passes through the surface layer 34, the phase of the beam is delayed by a timing period corresponding to the thickness of the surface layer 34. Since the reflected beam coming out of the region 36 has passed through the surface layer 34 twice, the phase of the beam is distinctly delayed as compared with the reflected beam coming out of the pit 35. Namely, the length of the optical path to the reflecting layer 32 passing through the pit 35 is smaller than the optical path passing through the region 36. In other words, the reflecting layer 32 under the pit 35 is optically convex with respect to the reflecting layer 32 under the region 36.

Therefore, when the laser beam 201 is applied to the leading edge of the pit 35 as shown in FIG. 2(a), the reflected beam 202 is inclined forwardly in the direction of running of the disk 9 as in the case where a beam is applied to the leading edge of a convex reflector. As shown in FIG. 2(b), when the laser beam 201 is applied to the center of the pit 35, the reflection angle of the beam 202 is the same angle to the incidence angle of the laser beam 201 and is not inclined forwardly nor backwardly. When the laser beam is applied to the trailing edge of the pit 35 as shown in FIG. 2(c), the reflected beam 202 is inclined backwardly in the direction of running of the disk 9 as in the case where a beam is applied to the trailing edge of a convex reflector.

In this embodiment, the only one kind of medium causing a phase difference depending on the presence or absence of the pit of the surface layer is shown. However, the other kind of medium can be utilized, in which the surface of the reflecting layer is convexed or concaved by the recording laser beam or in which the refraction index of the light-transmitting layer (corresponding to the intermediate layer 33 in FIG. 2(a)) is changed by the recording laser beam. It is also possible to use a medium such that the phase of the reflected beam is delayed in the leading edge of the pit 35, although in the described embodiment, the phase of the reflected beam is advanced in the leading edge of the pit 35.

Figure 3A:
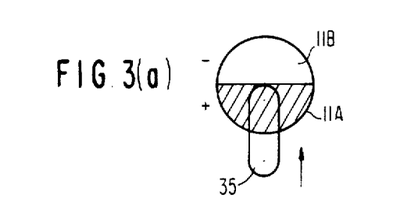
FIGS. 3(a) to 3(c) show the relationships between a pit on the optical disk and a photo-detector in the embodiment shown in FIG. 1.
Figure 3B:
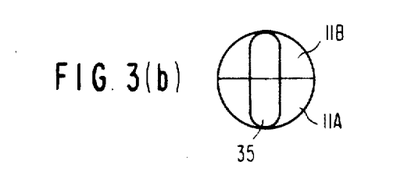
Figure 3C:
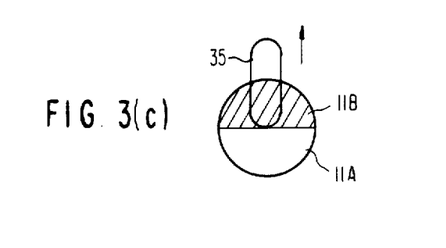
Figure 4:
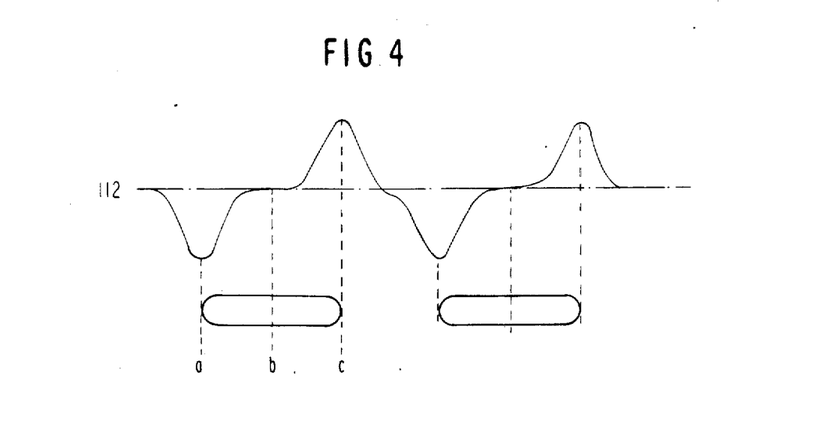
FIG. 4 is a waveform chart showing the waveform of output from a differential amplifier incorporated in the embodiment shown in FIG. 1.

FIGS. 3(a), 3(b) and 3(c) show a relationship between the pit 35 in the recording medium 10 and the photo-detector 11. The photo-detector 11 has two light-receiving devices 11A and 11B which are disposed at the leading side and trailing side, respectively, so as to receive the reflected beam from the recording medium 10 divided into a forward part and a backward part. When the laser beam is applied to the leading edge of the pit 35, the reflected beam is inclined forwardly in the direction of movement of the disk 9 as shown in FIG. 3(a). Therefore, the level of the output from the light-receiving device 11B exceeds the level of the output from the trailing light-receiving device 11A Consequently, the differential amplifier 12 produces a negative output voltage as shown in FIG. 4. When the laser beam is applied to the center of the pit 35 as shown in FIG. 3(b), the reflected beam is not deflected so that both light-receiving elements 11A and 11B receive almost an equal quantity of light. Therefore, the output 112 from the differential amplifier 12 is substantially zero. It is noted that the absolute value of the intensity of the reflected beam from the central portion of the pit 35 is greater than the intensity of the reflected beam from the region 36. However, the difference between the light quantity received by the light-receiving device 11A and that received by the light-receiving device 11B is substantially zero regardless of the intensity change. When the laser beam is applied to the trailing edge of the pit 35 (FIG. 3(c)), the reflected beam is inclined backwardly so that the output from the light-receiving device 11A takes a higher level than the light-receiving device 11B. In this case, therefore, the differential amplifier 12 produces a positive voltage as shown in FIG. 4. Thus, the polarity of the signal 112 is changed to negative and positive only when the beam spot impinges upon the leading and trailing edge of the pit 35, and the reverse polarities are obtained at these edges of the pit 35. Therefore, the mean value of the signal 112 is zero, and contains no direct current component. Accordingly, any comparison or transformation means for eliminating the level fluctuation attributable to a direct current are not required for a processing circuit of the signal 112.

From the foregoing description, it will be understood that the signal 112 has superior high-frequency characteristics as compared with the reproduced signal which is obtained solely by the variance of intensity of the reflected beam. Therefore, it is possible to increase the reading resolution of the information which is recorded at a high density in the recording medium 10. Further, since the level of the signal 112 is not easily changed by the fluctuation of the reflectivity in the region 36 or in the pit 35, the signal 112 can be distinguishable from the noise inherent in the medium 10.

As shown in FIG. 2(c), the information recording is performed by moving the disk 9 and applying the recording laser beam 201 selectively. When the recording laser beam 201 is applied, the surface layer 34 is molten to form a pit. In other words, the recording laser beam 201 always impinges upon the trailing edge of the pit. Since the pit is equivalent to a convex reflector as explained before, the reflected light beam 202 after forming the pit is inclined backwardly as in the case of a reflection from the trailing edge of a convex reflector. Consequently, the light-receiving device 11A receives a greater quantity of the reflected laser beam 202 than the light-receiving device 11B, and the intensity differential signal 112 takes a positive value while the pit is being formed. Since the change of the polarity of intensity differential signal 112 to the positive side occurs only when the beam spot impinges upon the trailing edge of the pit 35 or when the pit 35 is being formed, it is possible to detect whether the pit has been formed correctly by sensing the change of the polarity of the intensity signal 112 to the positive level.

The information recording operation of the optical information recording and reading apparatus shown in FIG. 1 will be described hereinunder with reference to FIGS. 5(a) to 5(f).

Figures 5A, 5F:
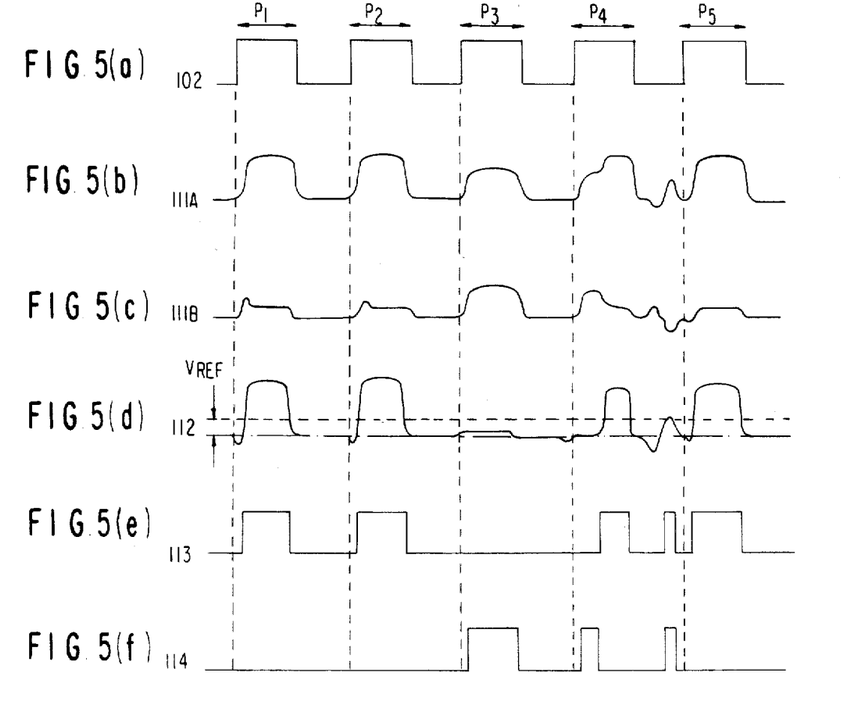

In accordance with the data from the host memory 1, the recording control circuit 2 produces a recording data signal (pulse signal) 102, for example, which takes a high level at each of periods $P_1$ to $P_5$ (FIG. 5(a)). When the record data signal 102 takes the high level, the laser driving circuit 3 supplies the semiconductor laser device 4 with an electric current large enough to produce a laser beam of an intensity sufficient for forming a pit in the medium 10. The laser beam from the semiconductor laser 4 impinges upon the recording medium 10 through the optical system 5, 6, 7 and 8. The laser beam forms a pit in the medium 10, and then, is reflected by the medium 10. The reflected beam is deflected by the beam splitter 6 and is directed to the photo-detector 11.

When the irradiation with the laser beam is commenced, i.e. when a pit is initially formed in the medium 10, a minute spot-like leading edge of the pit is formed first. At this time, the reflected beam is inclined slightly forwardly in the direction of movement of the disk 9. Consequently, the output signal 111B becomes slightly positive level as shown in FIG. 5(c), and the intensity difference signal 112 becomes slightly negative level as shown in FIG. 5(d).

As the disk 9 moves continuously, i.e., the pit is formed to have a certain length, the spot of the recording laser beam comes off from the leading edge of the pit, and impinges always upon the trailing edge of the pit. The reflected beam deflects backwardly in the direction of movement of the disk 9. Consequently, as shown in FIGS. 5(b) and 5(c), the level of the output current 111A is increased relatively to the output current 111B. At this time, the intensity differential signal 112 distinctly becomes positive level which is maintained while the pit is being formed, as shown in FIG. 5(d). When the recording data signal 102 becomes low level, the intensity of the laser beam emitted from the semiconductor laser device 4 is decreased correspondingly by the operation of the laser driving circuit 3. Therefore, the formation of the pit in the medium 10 is ceased. At the same time, the intensity of the reflected beam is also decreased so that the levels of the output currents 111A and 111B are decreased and the intensity differential signal 112 is decreased substantially to zero level.

The intensity differential signal 112 is compared by the comparator 13 with the reference level $V_{REF}$ (FIG. 5(d)) and the pit formation signal 113 is produced in accordance with the result of the comparison as shown in FIG. 5(e). In the initial period of the operation for forming the pit, the intensity differential signal 112 does not turn to the positive level. For this reason, the pulse width of the pit formation signal 113 does not directly show the length of the pit 35. However, since the unchanged period of the intensity differential signal 112 is extremely short and constant, correction of the pulse width of the pit formation signal 113 is easily realized. In addition, since the change of the intensity differential signal 112 to the positive level means that a pit is formed, it is possible to confirm the formation of the pit even by merely detecting the change of the intensity differential signal 112 to a certain positive level.

The pit formation signal 113 is compared with the recording data signal 102 by the recording error detector 14. The error detector 14 compares these signals after the correction of the pulse width of the pit formation signal 113. If the pit formation signal 113 do not accord with the recording data signal 102, the detector 14 produces a record error signal 114, as shown in FIG. 5(f). The comparison between the pit formation signal 113 and the recording data signal 102 can be easily done by, for example, an exclusive OR circuit.

In the embodiment shown in FIGS. 5(a) to 5(f), pits are correctly formed in the medium 10 in periods $P_1$ and $P_2$. In these periods, the intensity differential signal 112 largely changes to the positive level, so that the pit formation signal 113 has an almost equal waveform as the recording data signal 102. Therefore, the record error signal 114 is held at the low level to show that the recording has been made correctly.

In a period $P_3$, although the recording laser beam is applied, no pit is formed due to a defect in the medium 10. In this period, the light-receiving devices 11A and 11B are irradiated almost equally with the reflected beam, so that the output currents 111A and 111B take an almost equal level. Consequently, the intensity differential signal 112 is almost zero, and hence, the pit formation signal 113 continues to keep low level and does not accord with the recording data signal 102. As a result, the record error signal 114 takes a high level to inform the pit forming failure.

In a period $P_4$, the pit is not formed in the earlier half part of the period of high level of the recording data signal 102, but is formed in the later half of this period. In this case, the intensity differential signal 112 changes to the positive level only in the later half period in which the pit is formed. The pit formation signal 113 also takes the high level only in the later half period. Therefore, the difference between the recording data signal 102 and the pit formation signal 113 is detected by the error detector 14 with the result that the record error signal 114 takes the high level in the earlier half part of the period $P_4$. The error signal 114 shows that the pit of the period $P_4$ is not sufficient because a length of the pit is short as compared with the length of the recording data signal 102.

In the interval between the periods $P_4$ and $P_5$, the recording data signal 102 takes low level and the laser beam of decreased level is applied to the medium 10. If the reflected beam is deflected in this interval due to roughness inherently existing in the recording medium 10, the intensity differential signal 112 changes to the negative or positive level. If the level of this signal exceeds the reference level $V_{REF}$ the pit formation signal 113 takes the high level. Since this pit formation signal 113 does not accord with the recording data 102, the record error signal 114 takes the high level to inform the defect in the medium 10, i.e. the mis-recording.

The recording control circuit 2 counts the number of the times or periods at which the record error signal takes the high level. When the counted number exceeds a predetermined value, the recording control circuit 2 judges that the formation of the pit has been failed and make a re-recording of the same information in another recording area.

As described above, the intensity differential signal 112 is obtained simultaneously with the information recording, which distinctly shows whether the pit has been formed correctly in the medium 10. Therefore, the recording can be monitored at a high reliability and any error can be detected instantaneously. If any misrecording is found, it is also possible to re-record the information correctly in the area immediately after the failed pit. As a result, high reliability of the information recording is realized.

The reading operation of this optical information recording and reading apparatus will be described hereinunder with reference to FIGS. 6(a) to 6(d).

The laser driving circuit 3 supplies the semiconductor laser device 4 with an electric current for enabling the laser device 4 to continuously produce a laser beam of a low energy level. The level is suitable for reading the information recorded in the form of pits in the medium 10. The laser beam from the semiconductor laser device 4 is applied to the medium 10 through the optical system 5, 6, 7 and 8. The laser beam is reflected by the medium 10 and reaches the photo-detector 11 after deflection through the beam splitter 6. The outputs 111A and 111B from the light-receiving devices 11A and 11B are synthesized with each other by an adding amplifier 16.

Figures 6A, 6D:
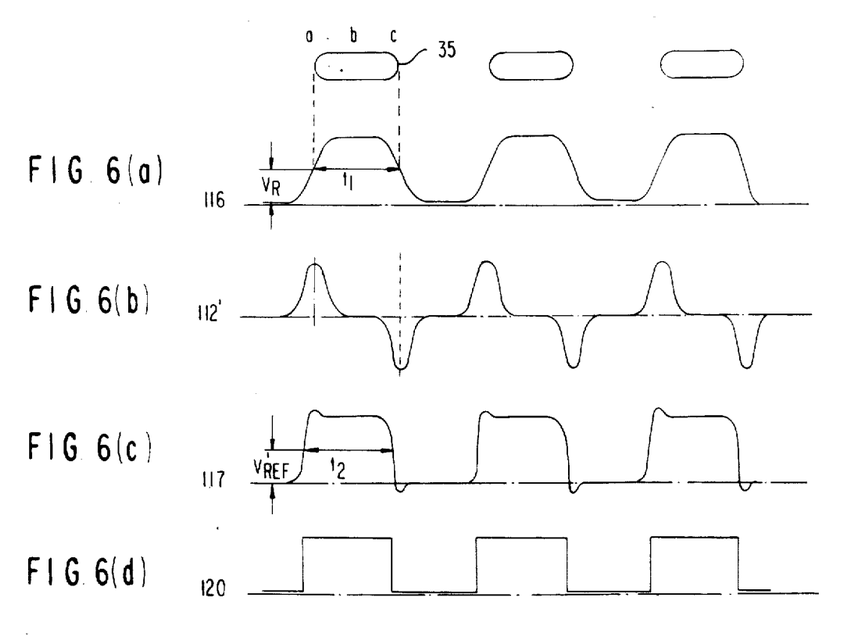

When the spot of the reading laser beam impinges upon a pit 35 in the medium 10, the intensity of the reflected beam turnes high level. Therefore, the intensity variance signal 116 of the adding amplifier 16 takes a high level, as shown in FIG. 6(a). However, when the reading beam spot passes the leading edge a or the trailing edge c of the pit 35, the rise and the fall of the intensity variance signal 116 is rather gentle. Therefore, a time duration $t_1$ between the leading and trailing edge of the pit 35 obtained by comparing the level of the signal 116 with a predetermined reference level $V_R$ is unaccurate and unstable because the time duration $t_1$ is easily changed even by a slight deviation of the amplitude of the intensity variance signal 116.

On the other hand, when the reading beam spot impinges on the leading edge a of the pit 35, the reflected beam is inclined forwardly so that the intensity differential signal 112 changes to negative level. To the contrary, the intensity differential signal 112 changes to positive level when the beam spot impinges upon the trailing edge c of the pit 35. Such change of the intensity differential signal 112 takes place only when the reading beam spot impinges upon the leading edge a or the trailing edge c of the pit 35. Additionally, the change of the signal 112 is steeper than the change of the intensity variance signal 116.

The polarity of this intensity differential signal 112 is inverted by the inverter 18, and then, the level of the inverted signal is adjusted by the level adjusting circuit 19. After these convertion, an intensity differential signal 112' exhibits a positive polarity at the leading edge a and negative polarity at the trailing edge c, as shown in FIG. 6(b). This intensity differential signal 112' is synthesized with the intensity variance signal 116 by the adding amplifier 17 to form a read signal 117 as shown in FIG. 6(c). The read signal 117 has a substantial rectangular configuration with steep rise and fall. The read signal 117 is compared by the comparator 20 with the reference level $V'_{REF}$ to detect the time duration $T_2$ between the leading and trailing edge of the pit 35. Since the rise and fall of the read signal 117 are steep, the time duration $t_2$ is stable regardless of a slight deviation of the read signal 117 or the reference level $V'_{REF}$. Therefore, as shown in FIG. 6(d), a digital reproduction signal 120 can be obtained which determines the starting and finishing timing of the pit 35 at a high accuracy and stability. The information in the recording medium 10 can be reproduced at a high fidelity by demodulating the digital read signal 120.

In this embodiment, the read signal 117 is formed by synthesizing the intensity differential signal 112' with the intensity variance signal 116. However, reproduction of the information can be performed by solely detecting the variance of the intensity differential signal 112 because the signal 112 shows the leading and trailing edge of the pit 35. In such a case, it is not necessary to use the amplifiers 16, 17 and the level adjusting circuit 19.

From the foregoing description, it will be understood that the described embodiment of the optical information recording and reading apparatus can reproduce the optical information recorded at a high density in the medium 10, with high resolution and accuracy.

As described above, the invention provides an improved optical information recording and reading apparatus in which the reliability of the recording and reading of the information into and out of the recording medium are realized by making use of the deflection of the reflected beam from the leading and trailing edges of the pit, and which can enhance the recording density of the information in the medium.

What is claimed is:

1. An optical information recording apparatus comprising:
   light beam generating means for generating a light beam corresponding to a data signal to be recorded;
   an optical system for applying said recording light beam onto a recording medium, said recording medium moving relative to said optical system in a first direction so that a series of pits are formed on a surface of said recording medium, said recording light beam being reflected by said recording medium;
   photo-detecting means for receiving the reflected beam of said recording light beam and for detecting the deflection of said reflected beam in a second direction reverse to said first direction to produce a pit formation signal; and
   error detecting means for detecting whether or not said data signal is correctly recorded on said recording medium by comparing said data signal with said pit formation signal.

2. The optical information recording apparatus as claimed in claim 1, wherein said recording medium has a reflecting layer, an intermediate layer formed on said reflecting layer and a surface layer covering said intermediate layer, said surface layer being selectively removed by said light beam thereby to record the information.

3. The optical information recording apparatus as claimed in claim 1, wherein said photo-detecting means includes first and second light-receiving elements each receiving a first portion and a second portion of said reflected beam, said first and second portions being divided in said first direction.

4. The optical information recording apparatus as claimed in claim 3, wherein said photo-detecting means further includes differential means for outputting the differential level between the outputs from said light-receiving elements, and a comparator means for comparing the output from said differential means with a predetermined reference level.

5. An optical information reading apparatus for reading recorded data from a recording medium, said recorded data being recorded in the form of a series of pits on the surface of said recording medium, comprising:

light beam generating means for continuously generating a light beam of constant level;

an optical system for applying said light beam onto said recording medium, said recording medium moving relative to said optical system in a first direction, said light beam being reflected by said recording medium; and photo-detecting means for reproducing said recorded data by detecting the deflection of the reflected beam in said first direction and a second direction reverse to said first direction.

6. The optical information reading apparatus as claimed in claim 5, wherein said photo-detecting means further includes means for detecting the intensity of said reflected beam, and means for summing the signal representing said deflection of said reflected beam and the signal representing said intensity of said reflected beam, said recorded data being reproduced by the summing signal.

7. The optical information reading apparatus as claimed in claim 5, wherein said recording medium has a reflecting layer, an intermediate layer formed on said reflecting layer and a surface layer covering said intermediate layer, the information being recorded by selectively removing of said surface layer.

8. The optical information reading apparatus as claimed in claim 5, wherein said photo-detecting means further includes first and second light-receiving elements each receiving a first portion and a second portion of said reflected beam, said first and second portions being divided in said first direction.

9. The optical information reading apparatus as claimed in claim 8, wherein said photo-detecting means further includes differential means for outputting the differential level between the outputs from said light-receiving elements, and a comparator means for comparing the output from said differential means with a predetermined reference level.

10. An optical information recording and reading apparatus comprising:

light beam generating means for generating a recording light beam corresponding to information to be recorded and reading light beam of a constant level;

an optical system for forcussing and applying said light beam onto a predetermined portion of a recording medium, said recording medium reflecting said light beam and deflecting the reflected beam in accordance with the recorded information thereon; and photo-detecting means for detecting the deflection of said reflected beam, said photo detecting means reproducing said recorded information by transmitting of said deflection while said recording light beam or said reading light beam is applied onto said recording medium.

* * * * *

UNITED STATES PATENT AND TRADEMARK OFFICE
CERTIFICATE OF CORRECTION

PATENT NO. : 4,648,085
DATED : March 3, 1987
INVENTOR(S) : Shimonou

It is certified that error appears in the above-identified patent and that said Letters Patent is hereby corrected as shown below:

COLUMN 10, LINE 58  After "and" insert --said--;

Signed and Sealed this

Fourteenth Day of June, 1988

Attest:

DONALD J. QUIGG

Attesting Officer

Commissioner of Patents and Trademarks